June 17, 1924.
G. HEIMLICH ET AL
1,498,166
TRANSMISSION CONSTRUCTION
Filed Nov. 18, 1921
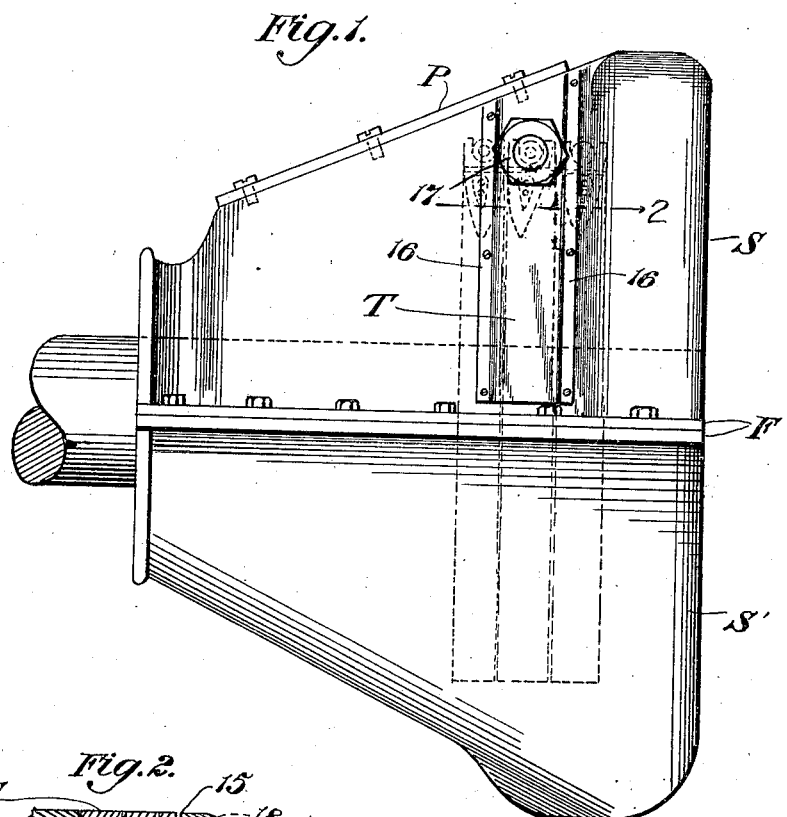
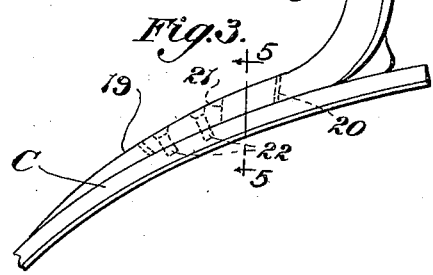
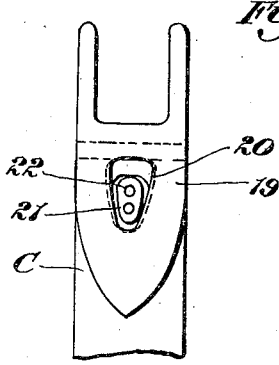
Inventor:
George Heimlich and
Charles Sutherland.
By Hazard & Miller
Attys.

Patented June 17, 1924.

1,498,166

UNITED STATES PATENT OFFICE.

GEORGE HEIMLICH AND CHARLES SUTHERLAND, OF LOS ANGELES, CALIFORNIA.

TRANSMISSION CONSTRUCTION.

Application filed November 18, 1921. Serial No. 516,080.

*To all whom it may concern:*

Be it known that we, GEORGE HEIMLICH and CHARLES SUTHERLAND, citizens of the United States, residing at Los Angeles, in the county of Los Angeles and State of California, have invented new and useful Improvements in Transmission Constructions, of which the following is a specification.

Our invention relates to band transmissions, and more particularly to housings therefor which, as heretofore constructed necessitates the removal of the upper section or half thereof when applying or removing the transmission bands.

It is a purpose of our invention to provide a specially constructed transmission housing which is adapted to work in conjunction with a specially constructed transmission band to permit of the application and removal of the band to and from the transmission without the necessity of removing the upper section of the housing.

We will describe one form of housing and one form of transmission band each embodying our invention, and will then point out the novel features thereof in claims.

In the accompanying drawings,

Figure 1 is a view showing in side elevation one form of transmission housing embodying our invention.

Fig. 2 is a transverse sectional view taken on the line 2—2 of Fig. 1.

Fig. 3 is a fragmentary enlarged detail view showing in side elevation one end of a transmission band.

Fig. 4 is a top plan view of the band shown in Fig. 3.

Fig. 5 is a transverse sectional view taken on the line 5—5 of Fig. 3.

Referring specifically to the drawings in which similar reference characters refer to similar parts, our invention, in its present embodiment, comprises the transmission housing which, as shown in Fig. 1, is constructed in the usual manner, in that it is provided with the upper and lower sections S and S' formed at their confronting edges with flanges F through which bolts extend for securing the sections together. The upper section S is provided with the usual entrance opening through which access is had to the screws in effecting an adjustment of the several transmission bands. This opening as usual is normally closed by the cover plate P.

As illustrated to advantage in Fig. 2, the section S is formed with a vertically disposed slot or opening 15 located at a point in the housing opposite to the intermediate drum or wheel of the transmission. The lower end of the slot 15 terminates at a point spaced from the corresponding flange F so as not to weaken the construction of the housing as a whole. The upper end of the slot communicates with the entrance opening covered by the plate P and the slot is of sufficient width to allow the ready passage of a transmission band therethrough. This slot 15, as shown in Figs. 1 and 2, is adapted to be completely closed by a plate T provided at its vertical edges with flanges 16 through which screws are adapted to extend for securing the plate to the housing. As shown in Fig. 2, the plate is transversely curved to carry out the general curvature of the housing at this point and to thereby allow of the ready manipulation of the adjusting screw 17 for the low transmission band. To accommodate this screw 17, the under side of the plate is provided with a projection 18 bored or threaded to receive the screw 17.

In conjunction with the slotted housing a special form of transmission band is adapted to be used which is of common construction with the exception that one of the end yokes or brackets designated at B is detachably associated with the transmission band C. As clearly shown in Figs. 3, 4 and 5, this bracket includes a curved plate 19 provided with a tapered slot 20 which is adapted to receive a tapered lug 21 secured to the band C by screws, rivets, or the like 22. As shown in Fig. 5, the slot 20 is of dovetail form in cross section, and the lug 21 is correspondingly shaped so that by inserting the lug in the wide end of the slot and then moving the bracket toward the end of the band, the lug will function to securely retain the bracket on the band.

In practice, when applying or removing the transmission bands to or from the transmission drums, it is necessary to remove the plates P and T. It is to be understood that the right hand end bracket of each transmission band is detachably associated with the band by means of the structure shown in Figs. 3, 4 and 5. When removing the bands, it will be clear that the right hand brackets are first removed from the bands so that the band can be slipped from the drum and withdrawn from the housing through the slot 15. As the slot is disposed opposite to the intermediate drum, it will of course be necessary to slide the other two bands from their respective drums to the intermediate drum in order that they may be removed through the slot 15.

From the foregoing operation it will be manifest that the application and removal of the transmission bands to and from the drums can be readily effected without the necessity of removing the entire upper section of the housing, as is now the present practice. The invention is of such simple construction as to permit of its adaptation to transmission housings as now constructed, it being understood that it is only necessary to form the slot 15 and to provide the specially constructed plate T. The present form of transmission band can be slightly modified in its construction to provide of the detachability of the bracket B, so that it will thus be seen that the invention as a whole is readily applicable to band transmissions.

Although we have herein shown and described one form of housing and one form of transmission band each embodying our invention, it is to be understood that various changes and modifications may be made herein without departing from the spirit of the invention and the spirit and scope of the appended claims.

What we claim is:

1. A bracket for transmission bands comprising a plate having a tapered slot therein, and a tapered lug removably fitted in said slot.

2. In combination, a transmission housing having a slot formed therein which communicates with the usual entrance opening, a plate for closing the opening curved to conform to the general contour of the housing, a projection on the plate bored and threaded so as to be adapted to receive an adjusting screw, and a transmission band having a detachable end bracket for the purpose specified.

3. A transmission band comprising a band portion, a tapered lug secured to the band portion, and a bracket portion having a tapered slot adapted to receive said lug for the purpose described.

4. A transmission band comprising a band portion, a tapered lug secured to the band portion, and a bracket portion having a tapered slot adapted to receive said lug for the purpose described, said slot and lug being of dovetail contour in cross section.

5. A transmission band comprising a band portion, one of said portions being provided with a tapered lug and the other portion with a tapered slot adapted to receive said lug for the purpose described.

In testimony whereof we have signed our names to this specification.

GEORGE HEIMLICH.
CHARLES SUTHERLAND.